Figure 1:
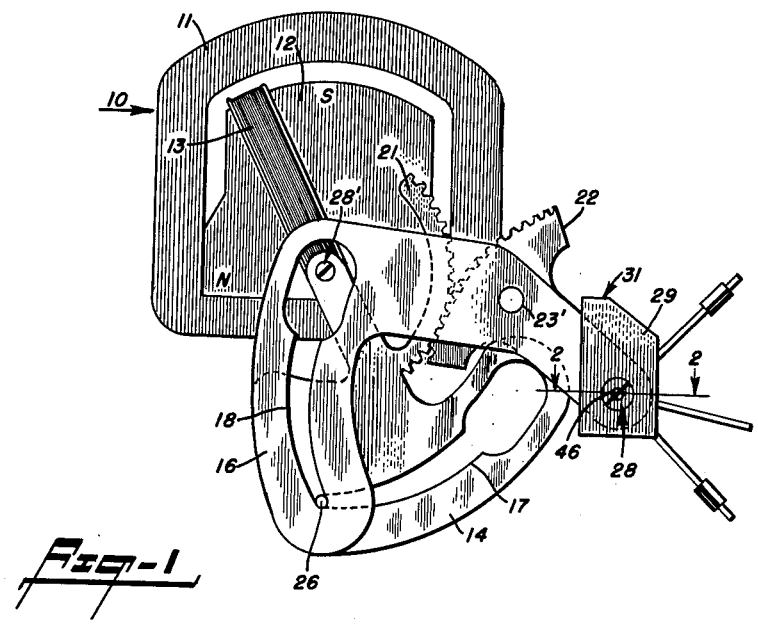

Feb. 12, 1963    J. PIGNONE    3,077,368
INSTRUMENT BEARING ARRANGEMENT
Filed Oct. 24, 1960

JOSEPH PIGNONE
INVENTOR.

BY
ATTORNEY 3,077,368
INSTRUMENT BEARING ARRANGEMENT
Joseph Pignone, West Orange, N.J., assignor, by mesne assignments, to Daystrom Incorporated, Murray Hill, N.J., a corporation of Texas
Filed Oct. 24, 1960, Ser. No. 64,330
6 Claims. (Cl. 308—159)

This invention relates to an instrument bearing arrangement and more particularly to an arrangement of supporting an instrument bearing.

Electrical instruments conventionally comprise a moving system which includes a pointer movable past a scale of values carried on a scale plate or, in the case of instrument relays, the moving system carries a relay contact for cooperation with a fixed contact. Damping of the moving system is often desired to prevent undue oscillation and vibration thereof. The bearing supporting arrangement of my invention includes means for the inclusion of damping liquid between a staff or pointed pivot element rotatably supported in the bearing carried by the said bearing supporting arrangement for the viscous damping thereof.

In some applications, a low torque-producing driving means, such as an instrument mechanism, is used to drive a gear train, or the like. An example of such an application is an automatic diaphragm control arrangement for cameras, or the like, in which the camera lens aperture is controlled by an electrical instrument coupled thereto by a gear drive arrangement. In such applications, it is essential that the driven gear element be provided with a mounting arrangement for precision location thereof to prevent binding or excess friction in the gear train due to misalignment therein. The bearing supporting arrangement of my invention includes means for precisely locating the bearing elements. Further, with my arrangement, a pair of pivot bearings for the support of a staff, or the like, may be located a maximum distance apart within any predetermined area, to permit the use of a staff of maximum length, for maximum precision in the location of the staff and the members attached thereto.

In the illustrated embodiment of the invention, described in detail hereinbelow, the novel bearing mounting arrangement is shown employed in the support of a staff which carries a diaphragm element and a sector of a gear coupled to the moving system of an electrical instrument mechanism for the control of a lens aperture. The invention is obviously not limited to such use, and the bearings may be used for pivotably or rotatably supporting pivot pins or a staff upon which any mechanism or device is mounted. Thus, for example, the bearings may be used in the support of the movable mechanism of a permanent magnet movable coil mechanism.

An object of this invention is the provision of a novel adjustable bearing arrangement for use in instrument mechanisms in which the bearing member of the arrangement is accurately located in a supporting screw adjacent the bottom of an axial hole formed in the screw whereby staffs or pivot pins of maximum length may be employed.

An object of this invention is the provision of a bearing comprising a bearing supporting screw having an axial hole formed therein, a bearing having a conical hole formed therein seated on the bottom of the hole, and a sleeve fitted in the hole and engaging the bearing to maintain the same in position in the screw, the said sleeve having a generally conical-shaped end for guiding a pivot pin or staff into seating engagement with the bearing.

An object of this invention is the provision of a bearing arrangement which includes means for the inclusion of a damping liquid between members of the bearing arrangement and a staff or pivot pin pivotably seated on a bearing included therein.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

Figure 2:
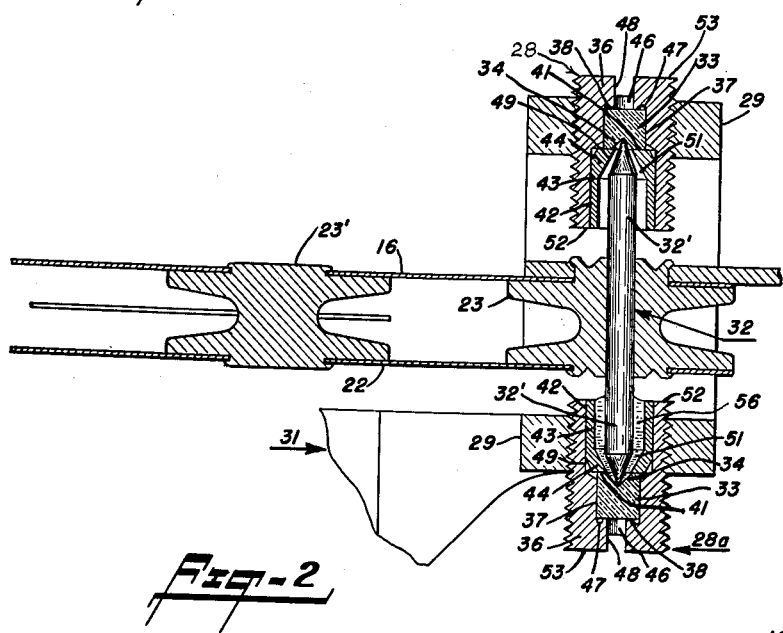

In the drawings wherein like reference characters denote like parts in the several views:

FIGURE 1 is a front view of an instrument actuated diaphragm arrangement embodying the bearing arrangement of my invention; and FIGURE 2 is a sectional view taken on line 2—2 of FIGURE 1.

Reference is first made to FIGURE 1 of the drawings wherein there is shown an electrical instrument mechanism 10 which includes a magnetic system comprising a soft iron yoke 11 encircling a permanent magnet 12. A wire wound movable coil 13 has one end pivotably movable in an arcuate flux gap between the magnet and yoke. The illustrated instrument is included in an automatic diaphragm arrangement for control of a camera lens aperture in response to the intensity of light striking a photoelectric cell, not shown. The output from the photoelectric cell is applied to the movable coil 13 which drives a diaphragm comprising a pair of vanes 14 and 16, having arcuate, teardrop-shaped apertures, or slots, 17 and 18, respectively, formed therein.

The vane 14 is shown attached to the movable coil 13 for rotation therewith. A gear sector 21 is formed with or secured to the vane 14 and engages a second gear sector 22 attached to the second vane 16 by posts 23, 23', as seen in FIGURE 2; the gear sector 22 and vane 14 being staked to the posts and located in a spaced parallel position. The pivot axis of the vanes, the teardrop-shaped apertures of the vanes, and the gear coupling between the vanes are all designed and relatively positioned such that a lens aperture 26 is provided by the said apertures, along the optical axis of the camera, the effective size of which depends upon the energization of the instrument 10.

It will be apparent that the pivot axis of the movable coil 13 which carries the vane 14 and gear sector 21, and the pivot axis of the gear sector 22 and vane 16 must be accurately located for proper functioning of the gear coupling. In accordance with my invention, novel jewel bearing assemblies 28 and 28a are secured to bifurcated arms 29 of a supporting structure 31 suitably secured to the instrument 10 by means not shown in the drawings. It will be understood that the bearing assembly, designated 28', for the pivotal support of the movable coil 13 may be of identical construction with either of the bearing assemblies 28 or 28a for the pivotal support of the driven vane 16. Only the details of the construction of the bearing assemblies 28 and 28a are shown in the sectional view of FIGURE 2, to which reference is now specifically made. As seen in FIGURE 2, a staff 32 extends through the post 23 and is secured thereto by any suitable means; the ends of the staff comprising pivots 32', 32' for the pivotal support of the vane 16 and gear sector 22.

The pivots 32', 32' are seated on generally cylindrical-shaped bearing elements, or jewel bearings 33, 33 within generally conical-shaped holes 34, 34 formed therein, which bearings are included in the novel bearing assemblies of my invention. The bearings 33 are carried in externally-threaded bearing supporting screws 36 which threadedly engage tapped holes axially formed in the bifurcated arms 29. Axial holes 37 are formed in the supporting screws 36 within which the jewel bearings 33 are positioned. The bottom surfaces 38 of the bearings 33 lie in planes perpendicular to the bearing axis, and the holes 37 in the screws 36 are defined by plane bottom surfaces 41 extending perpendicularly to the axis of the holes whereby the cylindrical bearings firmly seat on the bottom surfaces of the holes in substantially axial alignment therewith.

The axial holes 37 in the supporting screws are provided with an enlarged diameter outer end portion 42 within which a cylindrical retaining sleeve 43 is positioned; the relative diameter of the enlarged hole and outside diameter of the sleeve being such to provide a light press fit therebetween. The inner ends of the sleeves are provided with frustoconical sections 44 terminating in flat bottom surfaces, which engage the flat annular surfaces of the bearings 33 around the holes 34, 34, at the end thereof. The ends of the sleeves are squared with respect to the axis thereof, and in the assembly of the bearing assemblies the sleeves may be pressed along an axial path within the supporting screws by a spring loaded ram or the like. A small hole 46 is formed in the opposite end of each supporting screw which communicates with the cylindrical cavity for the jewel screw to enable the escape of air entrapped in the cavity by the jewel bearing. Further, the bottom surface 41 defining each of the holes 37 may be provided with an annular recess 47, if desired. The ends of the supporting screws 36 are provided with screw slots 48 for the reception of a screw driver for turning the bearing assemblies into the supporting arms.

The holes 37 and enlarged diameter portions 42 thereof are preferably interconnected by a generally conical-shaped wall section 49 to act as a guide for the jewel bearing 33 in the hole in the assembly thereof. The generally conical-shaped inner wall, designated 51, of the sleeve 43 acts as a guide surface for the insertion of the pivots 32' in the conical hole bearing surface of the bearing elements.

It will be noted that the holes 37 in the screws 36 which extend axially from one end 52 of each of the screws 36 terminate adjacent the other end 53 thereof, the depth of the holes being greater than twice the height of the jewel bearing elements. There exists, therefore, a relatively long annular space between the sleeve 43 and pivots 32' suitable for the reception of oil, or other fluid, for the viscous damping of the pivotable staff. For purposes of illustration, the one bearing assembly 28a is shown provided with viscous damping means, while the assembly 28 is shown without such damping means. Damping liquid 56 is shown included between the staff and sleeve of the bearing assembly 28a, and suitable anti-creep matter, not shown, may be applied to the staff adjacent the open end of the sleeve to maintain the liquid therewithin. With my novel arrangement, viscous damping is provided without adding to the space requirements of the arrangement.

Having now described this invention in detail, various changes and modifications will suggest themselves to those skilled in this art. It is intended that such changes and modifications may be made without departing from the spirit and scope of the invention as set forth in the following claims.

I claim:
1. A bearing assembly for support of a pivot or the like, comprising a bearing supporting screw, an axial hole in one end of the screw which hole has a cylindrical portion adjacent its inner end for holding a bearing element, and an enlarged diameter outer end portion, a bearing element seated in said cylindrical portion of the hole in the supporting screw and formed with a central portion to receive the pivot, and a generally cylindrical sleeve engaging the enlarged diameter portion of the hole and engaging the bearing element only at the annular portion thereof around that which receives the pivot to maintain the element in the hole.

2. The invention as recited in claim 1 including damping liquid within the said sleeve for damping the pivot supported by the bearing element.

3. The invention as recited in claim 1 wherein the axial hole extends from one end of the screw and terminates adjacent the other end thereof, the depth of the hole being substantially greater than the height of the bearing element.

4. The invention as recited in claim 1 wherein the inner end of the said sleeve is provided with a generally conical shape of decreased diameter for guiding a pivot onto the bearing element.

5. The invention as recited in claim 1 wherein the axial hole and enlarged diameter portion of such hole are interconnected by a generally conical-shaped wall section for guiding the bearing element into the said hole during assembly of the bearing assembly.

6. A bearing assembly for support of a pointed pivot or the like, and comprising an externally-threaded bearing supporting screw, an axial hole in one end of the screw, which hole terminates adjacent the other end thereof, the hole having an enlarged diameter portion at the outer end thereof with a conical-shaped portion between the inner portion of the hole and enlarged diameter portion thereof, a generally cylindrical-shaped bearing element in the inner portion of the hole having a conical-shaped pivot bearing surface hole formed in one end thereof, a sleeve with a generally conical-shaped end portion press fitted in the enlarged diameter portion of the hole with the end of the conical-shaped portion in contact with the bearing element around the conical bearing hole, and damping liquid located within the said sleeve.

References Cited in the file of this patent
UNITED STATES PATENTS

| | | |
|---|---|---|
| 1,754,085 | Faus | Apr. 8, 1930 |
| 2,111,629 | Holtz | Mar. 22, 1938 |
| 2,611,071 | Palmieri | Sept. 16, 1952 |